United States Patent

Baer

[15] 3,673,282
[45] June 27, 1972

[54] CORE-SHELL VINYL HALIDE POLYMERS HAVING A LONG-CHAIN VINYL ETHER CONTAINING SHELL

[72] Inventor: Massimo Baer, Longmeadow, Mass.
[73] Assignee: Monsanto Company, St. Louis, Mo.
[22] Filed: May 15, 1970
[21] Appl. No.: 37,880

Related U.S. Application Data

[63] Continuation-in-part of Ser. No. 669,386, Sept. 21, 1967, abandoned.

[52] U.S. Cl. .................... 260/884, 260/29.6 RB, 260/41 A, 260/41 AG, 260/876, 260/881
[51] Int. Cl. .................................. C08f 15/06, C08f 15/26
[58] Field of Search .................................................. 260/884

[56] References Cited

UNITED STATES PATENTS

| | | | |
|---|---|---|---|
| 3,373,228 | 3/1968 | Glazer et al. | 260/884 |
| 3,290,265 | 12/1966 | Kaneko | 260/29.6 |
| 3,475,361 | 10/1969 | Garner | 260/23 |

Primary Examiner—Murray Tillman
Assistant Examiner—J. Seibert
Attorney—John W. Klooster, James C. Logomasini, Richard W. Sternberg and Neal E. Willis

[57] ABSTRACT

There is disclosed a process for the preparation of copolymers of a vinyl halide and a long-chain aliphatic vinyl monomer. In accordance with the process, an aqueous dispersion is formed of a preformed vinyl halide polymer, a vinyl halide monomer and a long-chain aliphatic ether monomer capable of copolymerizing with the vinyl halide monomer. Copolymerization of said monomers in the presence of the aqueous dispersion of the preformed polymer leads to a polymeric particle whose shell contains a major proportion of the polymeric long-chain aliphatic ether monomer and whose core is essentially devoid of this monomer. This preferential concentration of a lubricating monomer on the outer shell of the particle leads to greatly improved flow with only a minor loss in glass temperature.

6 Claims, No Drawings

CORE-SHELL VINYL HALIDE POLYMERS HAVING A LONG-CHAIN VINYL ETHER CONTAINING SHELL

RELATED APPLICATION

This application is a continuation-in-part of my earlier filed application, Ser. No. 669,386, filed Sept. 21, 1967, now abandoned.

BACKGROUND

Although vinyl halide polymers which are currently available exhibit many desirable properties, they are oftentimes rather difficult to process and may produce articles which are without modification rough and brittle. To overcome these deficiencies, various added lubricants or plasticizers have been used in the past with varying degrees of success.

In order to provide the desired lubricity, so-called "external lubricants" have often been used. These are materials which are incorporated into the polymer after it is formed, such as the waxes, etc., and they are generally quite incompatible with the base resin. This factor imposes a limitation upon the maximum amount of such an additive that can be used, since inclusion of the amounts necessary to provide desirable levels of lubricity (or plasticity) results in a great tendency for exudation or plating-out of the material. In addition, the external plasticizers are frequently detrimental to clarity and chemical resistance of the resins in which they are utilized. Accordingly, the use of such additives has resulted in difficulties, particularly when used in amounts greater than about 1 percent, due largely to the plating-out phenomenon.

Although "internal plasticizers" (i.e. compounds copolymerized with the monomers forming the base resin) have heretofore been proposed for vinyl halide polymers, they typically display a tendency to induce significant undesirable reductions in the glass transition temperature and in the resin tensile strength properties. In addition, such prior art approaches have not usually provided the high levels of lubricity (or low levels of melt viscosity) and of product smoothness which are important for many applications. Moreover, such prior art internal plasticizers have tended to produce undesirable high levels of "puff-up" in extruded materials, i.e., excessive extrudate swelling.

Accordingly, it is an object of the present invention to provide vinyl halide polymers having low melt viscosity and which exhibit smoothness, uniformity and minimized extrudate puff-up in molded and extruded structures.

It is also an object to provide modified vinyl halide polymers wherein there is no tendency for extrudation or plating-out of lubricating additives and wherein reductions in glass transition temperatures and tensile properties are minimized.

Another object is to provide novel processes wherein the foregoing objects are attained conveniently, economically and without substantially increasing the time required for reaction cycles over those necessary for the production of unmodified vinyl halide polymers.

SUMMARY

The present invention is directed to a process for making a vinyl halide polymer which involves as an initial step the forming of an aqueous dispersion. This dispersion comprises water and, as reactants, (on a total 100 parts by weight basis) from about 40 to 80 parts by weight of vinyl halide polymer particles ranging in average cross-sectional dimension from about 0.05 to 150 microns, and from about 20 to 60 parts by weight of a monomer mixture comprising (on a 100 weight percent total mixture basis) from about 70 to 98 weight percent vinyl halide monomer, and the balance up to 100 weight percent of any given such mixture being at least one long-chain aliphatic vinyl ether compound.

The vinyl halide polymer particles comprise at least about 75 weight percent of a polymerized vinyl halide, with the balance up to 100 weight percent of any given such group of polymer particles being at least one copolymerized ethylenically unsaturated aliphatic monomer having a molecular weight under about 100.

The long-chain aliphatic vinyl ether monomer is characterized by the general formula:

(I) 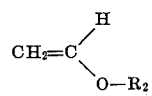

where $R_2$ is an aliphatic radical containing from eight through 22 carbon.

The next process step involves subjecting the so-formed aqueous dispersion to polymerization conditions for a period of time sufficient to polymerize at least a substantial portion of the polymerizable monomers present therein.

Finally, in a last processing step, one recovers the resulting polymeric product by any conventional means, e.g., spray drying, agglomeration, precipitation, etc.

The present invention is further directed to a vinyl halide polymer which is produced by the foregoing process and which is characteristically initially in the form of discrete particles. Each individual such particle has both a core portion and a shell portion which are integral with one another. A core portion ranges in average cross-sectional size from about 0.05 to 160 microns, and a core composition comprises at least about 75 weight percent of a polymerized vinyl halide, with the balance up to 100 weight percent of any given such composition being at least one copolymerized ethylenically unsaturated aliphatic monomer having a molecular weight under about 100.

A shell portion has a different composition of typically from about 2 to 30 weight percent of at least one polymerized long-chain aliphatic vinyl ether compound, with the balance up to 100 weight percent of any given shell composition being copolymerized vinyl halide. The weight ratio of a shell portion to a core portion ranges from about 0.20:1 to 1.50:1. The long-chain aliphatic vinyl ether compound is as defined above.

DETAILED DESCRIPTION

Core Portion Polymer

As indicated, a core portion polymer comprises a vinyl halide polymer which may be not only homopolymerized vinyl halide but also vinyl halide copolymerized with at least one other ethylenically unsaturated monomer.

Vinyl halide polymers are well known. The vinyl halides which are generally suitable for use in a vinyl halide polymer include vinyl chloride (preferred) and vinyl fluoride. A vinyl halide monomer may be polymerized alone or in combination with other vinyl monomers and/or other ethylenically unsaturated compounds. In the case of a copolymer with another ethylenically unsaturated compound, the amount of comonomer generally does not exceed about 25 percent of the weight of the resulting vinyl halide polymer, and preferably the amount of the second component is less than about 15 percent of the product.

Ethylenically unsaturated monomers which may be interpolymerized with the vinyl halides typically have molecular weights under about 100 and include vinylidene halides, such as vinylidene chloride; vinyl esters of monobasic organic acids containing one–eight carbon atoms such as vinyl acetate; acrylic and alpha-alkyl acrylic acids, such as acrylic and methacrylic acids; the alkyl esters of such acrylic and alkyl-acrylic acids containing one–eight carbon atoms such as methyl acrylate, ethyl acrylate, butyl acrylate, hexyl acrylate and the corresponding methyl methacrylate esters; dialkyl esters of dibasic organic acids in which the alkyl groups contain about two–five carbon atoms, such as dibutyl fumarate, diethyl maleate, etc.; amides of acrylic and alkyl-acrylic acids, such as acrylamide, methacrylamide; unsaturated nitriles, such as acrylonitrile, methacrylonitrile, ethacrylonitrile; vinyl alkyl ethers and ketones such as vinyl methyl ether, 2-ethyl hexyl vinyl ether, etc. and various other ethylenically unsaturated compounds copolymerizable with the vinyl halides. Mixtures of compounds exemplified by the foregoing materials may also be used.

The method used to prepare a vinyl halide resin may be any which is commonly practiced in the art such as en masse, in suspension or emulsion. From the standpoint of economics and process control, highly suitable polymers for the core portion can be prepared by a method in which the monomer reactants are suspended in water.

Preferred vinyl halide polymers have chlorine contents ranging from about 45.0 to 56.7 and have molecular weights such that a 0.4 weight percent solution of such polymer in cyclohexanone at 25° C. has a specific viscosity of from about 0.3 to 0.6. More preferred specific viscosities range from about 0.35–0.50. A more preferred class of vinyl chloride polymer is polyvinyl chloride homopolymer.

Shell Portion Polymer

As indicated, a shell portion polymer comprises a vinyl halide polymer which is modified by the incorporation thereinto of a long-chain aliphatic vinyl ether monomer of formula (I), above, in specified amounts.

Structurally, the shell is an integral part of the entire product particle, and should not be considered as separated from the core by a distinct and sharp compositional boundary. Extremely small quantities of long-chain aliphatic monomer possibly may be in the core portion of a product polymer due to slight swelling of the preformed core by the monomers in the starting dispersion used to prepare the product polymer. On polymerization, therefore, one may obtain some long-chain aliphatic vinyl ether monomer polymerized into the core portion.

A shell portion may contain polymeric chains which are chemically attached (i.e. grafted) to the preformed inner core.

Product particles of this invention are lubricious, display low levels of melt viscosity, and have high molded body surface smoothness, as compared, for example, to core polymer portions only similarly processed.

The Long-Chain Aliphatic Vinyl Monomer

To achieve the desired lubricity in the ultimate products, it has been found to be necessary that a long-chain aliphatic vinyl ether monomer possess as its long-chain aliphatic component a radical which is essentially incompatible with the base resin, i.e., one having from about eight through 22 carbon atoms, and preferably from about 12 through 18 carbon atoms. The aliphatic radical should have at least eight carbon atoms in the chain since it is found that the degree of lubricity desired is not achieved when the radical is shorter. On the other hand, aliphatic chains containing more than 18 carbon atoms tend to be less desirable since the longer chain compounds frequently retard the rate of reaction although compounds containing aliphatic radicals having up to 22 carbon atoms are also useful in some circumstances. Preferably such long-chain aliphatic radical is an alkyl radical.

The vinyl component should not include an aromatic ring directly attached thereto since such a ring structure is known to retard the polymerization rate of vinyl halides. However, any of a very wide variety of vinyl compounds can be used to practice the present invention.

Exemplary ether compounds of formula (I) include alkyl vinyl ethers, such as lauryl vinyl ether, myristyl vinyl ether, cetyl vinyl ether (preferred), stearyl and the like.

The amount of such monomer that is employed in a product will generally be about 2.0 to 30.0 percent, and preferably about 3.0 to 25.0 percent, based upon the total shell weight. It is generally found that use of an amount of long-chain aliphatic vinyl ether monomer less than about 2.0 percent is quite ineffective. On the other hand using more than about 30.0 per cent may result in over lubrication and a relatively undesirable product.

Either a single long-chain aliphatic vinyl ether monomer or a mixture of two or more such monomers can be used. In some instances, it is preferable to utilize a combination of such monomers since it is found that, although the vinyl ether halide and a single long-chain aliphatic vinyl monomer may be present simultaneously, the distribution thereof is not homogeneous due to differences in the reactivity thereof. By using two such modifying monomers, one of which has a faster reaction rate and the other of which has a slower reaction rate than the vinyl halide monomer, a relatively uniform distribution of vinyl halide and modifying monomer can be produced in the exterior portion of the product particles.

The Polymerization Process

Although the process of this invention may utilize a preformed vinyl halide polymer phase (core) prepared separately and introduced into the reactor concurrently with the vinyl halide monomer formulation, the preferred processes utilize the same reactor to generate the polymer core phase and then add the long-chain aliphatic vinyl ether monomer and any additional vinyl halide to the reactor to produce a shell. In other words, a vinyl halide monomer formulation which is free from the long-chain aliphatic vinyl monomer is partially polymerized to generate the polymer core phase prior to introduction of the long-chain aliphatic vinyl monomer.

Although any aqueous dispersion technique may be utilized in accordance with the present invention, processes in which the shell polymerization reaction is effected in suspension are preferred. The amount of water which is charged to the reaction vessel is generally that which will result in the maximum utilization of reactor volume consistent with a sufficiently low slurry viscosity to maintain adequate heat transfer, etc. Accordingly, the amount of water will generally be about 65 to 250 parts by weight per 100 parts of total monomer charged.

In the preferred suspension polymerization process, the water and suspending agent are charged in an agitated vessel which is then sealed and purged of oxygen, such as with a vacuum and/or an inert gas. Thereafter a polymerizable vinyl halide monomer formulation is dispersed in the water and a suitable initiator is added. If necessary, the dispersion is then heated to polymerization temperatures, usually about 25° to 100° C. and preferably 40° to 65° C. to polymerize about 40 to 80 percent, and preferably 55 to 75 percent, of the polymerizable monomers present in the formulation. This polymerization usually requires 2 to 8 hours and is preferably completed in about 2 to 5 hours. At this point, a vinyl halide polymer phase is dispersed in the aqueous reaction medium.

The long-chain aliphatic vinyl ether monomer preferably is next introduced into the reaction vessel and this may be done without interruption of the polymerization reaction. Alternatively, the polymerization vessel may be vented and cooled and thereafter recharged with the desired monomers and any portion of the original polymerizable monomer formulation that may have been removed in the venting step. Polymerization is then allowed to continue for an additional period of time necessary to polymerize at least a substantial portion of the polymerizable monomers ultimately present in the mixture. Polymerization for about 3 to 20 hours is required to complete the reaction, but preferably the polymerization should be completed in less than eight hours. This, of course, depends upon the degree of conversion desired, but, as a practical matter, 88.0 to 98.0 percent conversion of monomer is preferred. The time required to carry the reaction to higher levels of completion is generally not warranted when all factors are considered. Residual monomer may be removed and the resin particles recovered in a conventional manner, depending upon the aqueous polymerization technique employed.

The polymerization reaction may be initiated and accelerated by heat, irradiation, and/or polymerization catalysts. Catalysts which have been found to be particularly useful are the monomer-soluble organic peroxides such as benzoyl peroxide, lauroyl peroxide, 2,4-dichlorobenzoyl peroxide, acetyl peroxide, acetyl benzoyl peroxide, acetyl cyclohexane sulfonyl peroxide; alkyl percarbonates; perborates; azo compounds, and mixtures thereof. When the reaction is to be effected in emulsion, the well-known "redox" type catalysts advantageously may be used. Mixtures, for example, of sodium bisulfite and potassium persulfate are suitable in conjunction with a small amount of an activating metal ion and optionally a bicarbonate buffer.

The quantity of catalyst used will be varied depending upon its activity, the quantity of monomer and economical considerations. Normally, the amount of catalyst will be chosen so as to give an overall rate of reaction of less than about ten hours. When the catalyst is of the peroxide type, an amount of about 0.01 to 3.0 percent, preferably 0.05 to 1.0 percent based upon the total weight of polymerizable monomers present in the reaction, will be used.

The reaction is desirably carried out in the presence of chain regulators, such as chlorinated hydrocarbons, alcohols, aldehydes, etc. Suitable suspending agents that can be used are hydrophilic, macro-molecular, natural or synthetic colloids and non-ionic and ionic synthetic surfactants and mixtures thereof including polyvinyl alcohol and polyacrylic acid. Exemplary of the emulsifying agents which can be employed are the alkyl sulfates such as sodium lauryl sulfate.

Other variations of the aqueous polymerization process are also possible, such as the addition of more catalyst with the long-chain aliphatic vinyl ether monomer to ensure a desirable degree of conversion and rate of reaction. It is also possible to polymerize substantially all of the polymerizable monomer formulation initially introduced and then add additional polymerizable vinyl halide monomer formulation with the long-chain aliphatic vinyl ether monomer.

Whatever technique is used, it is essential to the present invention that the long-chain aliphatic vinyl ether monomer be admixed with a dispersion of a polymer of vinyl halide formed prior to introduction of the long-chain monomer. A high concentration of the long-chain aliphatic vinyl monomer is thereby achieved on the exterior of the resin particles, with a vinyl halide polymeric or interpolymeric central core essentially free of the long-chain compound. Since it is the relative incompatibility of these long-chain monomers which is believed to be responsible for the improved lubricity, concentrating the monomer, and hence the long aliphatic chains, in a shell of the resin particles greatly enhances this effect and makes maximum use of the long-chain aliphatic vinyl monomer. For this reason, when the polymer phase and the final polymeric product are prepared in consecutive steps of a single reaction cycle, it is most beneficial to introduce the long-chain vinyl ether monomer after a fairly large portion of the base resin has been produced.

Adding the long-chain aliphatic vinyl ether monomer after polymerization of a large portion of the initial vinyl halide monomer has taken place avoids the rate retardation normally experienced when copolymerizing vinyl chloride with the long-chain aliphatic vinyl ether monomers.

Adding the long-chain monomer at too late a point in the reaction, however, may result in residual long-chain aliphatic vinyl ether monomer since in many cases the reaction rate thereof is slower than that of the monomers of the polymerizable monomer formulation. All of these considerations should be borne in mind when determining the point of introduction of the long-chain compound.

Other Components in the Polymeric Product

The compositions of the invention may additionally contain additives such as stabilizers, fillers, colorants, processing aids, rubbers, etc. Furthermore, although the present compositions are generally fully within the scope of the invention to include other lubricants or processing aids. For example, small amounts of metallic stearates, methyl methacrylate polymers, may be included. The compositions can also be reinforced with inorganic materials, such as asbestos or glass fibers.

Although the modified polymers of the present invention can be employed alone, they can be blended with other polymeric materials. For example, it may be desirable to admix a quantity of the modified vinyl halide composition of the invention with a quantity of preformed vinyl halide homopolymer or copolymer. In such a case, the components may be admixed in substantially any proportion; however, it is apparent that if too little of the instant polymer product is utilized, the advantageous effects thereof will not be realized. Accordingly, the products of the present invention should be used in an amount of at least 50 percent by weight of such a mixture.

SPECIFIC EXAMPLES

Exemplary of the efficacy of the present invention are the following specific examples wherein all parts and percentages are on a weight basis unless otherwise indicated.

EXAMPLE 1

A series of vinyl chloride copolymers is prepared by first purging reaction vessels with nitrogen and then charging them with about 200 parts of distilled water containing about 0.25 part of a suspending agent and about 0.20 part of a surfactant. The vessels and their contents are then cooled by chilled water while maintaining a nitrogen atmosphere, after which 95 parts of vinyl chloride monomer (VC) and 0.25 part of lauroyl peroxide initiator are added and the vessels sealed.

The vessels are then agitated at a temperature of about 60° C. and when the desired degree of conversion is reached, the vessels are vented. After that, the reactors are cooled by chilled water and charged with cetyl vinyl ether (CVE) monomer and a quantity of vinyl chloride monomer equal to that lost by venting.

Polymerization is thereafter resumed in the resealed vessels at 60° C. for an additional period of about 16 to 20 hours to polymerize about 95 to 100 percent of the polymerizable monomers present. The resulting polymer is filtered, washed with water and then treated with hot methanol or hot hexane to ensure that all unreacted cetyl vinyl ether is removed.

In Table I which follows, data are presented showing the physical properties of copolymers prepared in the manner outlined. Also presented, for purposes of comparison, are data developed using samples of poly(vinyl chloride) having a number of specific viscosities and prepared without any long-chain aliphatic vinyl monomer. Data on one copolymer

TABLE I

| | Conversion of VC when CVE added (percent) | Parts CVE charged | Specific viscosity [1] | Apparent melt viscosity [2] | Tg [3] | Puff-up [4] |
|---|---|---|---|---|---|---|
| Polymer: | | | | | | |
| A [5] | 52.5 | 5 | 0.35 | 3.3 | 75.4 | 1.15 |
| B [6] | 52.5 | 5 | 0.34 | 2.6–2.9 | 78.2 | 1.13 |
| C [7] | 64 | 5 | 0.34 | 2.2 | 74.5 | 1.03 |
| D [5] | 70 | 5 | 0.35 | 2.0 | 76 | 1.12 |
| E [6] | 70 | 5 | 0.35 | 4.7–5.4 | 75 | 1.19 |
| F [6] | 82 | 5 | | 5.2 | | 1.22 |
| G [6] | 89 | 5 | | 6.0 | | 1.18 |
| H | 69 | 1.5 | | 6.0 | | 1.19 |
| I | 60 | 3.0 | | 5.3 | | 1.24 |
| J | | 0 | 0.38 | 8.7 | | 1.21 |
| K | | 0 | 0.30 | 4.9 | 78–79 | 1.17 |
| L | | 0 | 0.39 | 7.8–9 | 79–80 | 1.15 |
| M | 0 | 10 | 0.24 | 1.3 | 63 | 1.27 |

[1] Measured in cyclohexanone at 25° C. (0.4 g./100 ml. of solvent).
[2] Pounds per square inch times seconds, measured at 10 reciprocal seconds and 350° F.
[3] Glass-transition temperature (° C.).
[4] Ratio of extrudate to capillary diameter.
[5] Extracted with cold methanol.
[6] Extracted with hot hexane.
[7] Extracted with hot methanol.

prepared by adding the CVE with the initial VC monomer charge and then effecting polymerization are also included. For this product only 90 parts of VC monomer are used.

Each of the product polymers of Examples A–I thus comprises product polymer particles having a core portion of polyvinyl chloride and a shell portion of cetyl vinyl ether/vinyl chloride copolymer.

From Table I, it can be seen by comparing polymers A–I with polymers J–L that the addition of the long-chain aliphatic vinyl monomer significantly reduces melt viscosity and reduces puff-up compared to polymers to which no CVE is added. Apparent melt viscosity is a reliable measure of flow (the lower the apparent viscosity, the better the flow), so that by comparing polymers of comparable molecular weight (the specific viscosity is indicative of this), the effectiveness of the additive can be seen. Thus, polymer K, which contains no CVE, is of low molecular weight and has an apparent viscosity of 4.9. Although each of the polymers A–D are of significantly higher molecular weight than polymer K, they exhibit much better flow than polymer K, by virtue of the inclusion of CVE.

Polymer M, which contain 10 per cent of CVE, but which was prepared by charging the CVE initially rather than later, exhibits good flow; it is seen, however, that this level is obtained only at the expense of a high puff-up and severe decrease in glass-transition temperature. Since the molecular weight of polymer M is much lower than any of these of the polymers A–I, no realistic comparison of the effect of late addition on flow can be made because it would be expected that such an improvement would be attendant to so low a molecular weight.

EXAMPLE 2

Using the procedure of Example 1 a polymer is prepared having a specific viscosity of about 0.34 containing about 95 percent of VC and about 5 percent of CVE. A mechanical blend of 50 percent of polymer M of Example 1 (containing 90 percent VC and 10 percent CVE, prepared from an initial mixture of both components) and 50 percent of preformed vinyl chloride homopolymer is prepared to provide a sample containing 5 percent by weight of CVE. This sample has a molecular weight significantly below that of the polymer having a specific viscosity of 0.34, so that it would be expected that its degree of lubricity would be higher (lower apparent viscosity).

Apparent viscosities of both polymers are measured at two shear rates and 350° F., and it is found, as is shown in Table II below, that the flow of the shell-core polymer is better than the simultaneous addition (normal copolymer) product, notwithstanding the higher molecular weight of the former.

TABLE II

| Polymer | Specific Viscosity | Shear Rate | Apparent Viscosity |
| --- | --- | --- | --- |
| Simultaneous addition of VC and CVE | 0.30 | 10 | 3.1 |
| Late addition of CVE) to partially poly- ) merized VC ) | 0.34 | 10 | 2.2 |
| | | 100 | 0.44 |

What is claimed is:

1. A process for making a vinyl halide polymer comprising the steps of:
   A. forming an aqueous dispersion comprising water and, as reactants, (on a 100 parts by weight total basis):
      1. from about 40 to 80 parts by weight of preformed vinyl halide polymer particles ranging in average cross-sectional dimension from about 0.05 to 150 microns, said polymer particles comprising:
         a. at least about 75 weight percent of a polymerized vinyl halide, and
         b. the balance up to 25 weight percent of any given such polymer particle being at least one copolymerized ethylenically unsaturated aliphatic monomer having a molecular weight under about 100,
      2. from about 20 to 60 parts by weight of a monomer mixture comprising (on a 100 weight percent total mixture basis):
         a. from about 70 to 98 weight percent vinyl halide monomer, and
         b. the balance up to 30 weight percent of any given such mixture being at least one long-chain aliphatic vinyl compound characterized by the general formula:

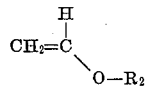

where $R_2$ is an aliphatic radical containing from 8 through 22 carbons,
   B. subjecting said aqueous dispersion to polymerization conditions for a period of time sufficient to polymerize at least a substantial portion of the polymerizable monomers present therein, and
   C. recovering the resulting polymeric product.

2. The process of claim 1 wherein said vinyl halide polymer particles comprise homopolyvinyl chloride.

3. The process of claim 1 wherein said long-chain aliphatic vinyl monomer is cetyl vinyl ether.

4. A vinyl halide polymer initially in the form of discrete particles, each such particle having a core portion and a shell portion integral therewith,
   A. said core portion:
      1. ranging in average size from about 0.05 to 150 microns,
      2. comprising a first polymer whose composition comprises:
         a. at least about 75 weight percent of a polymerized vinyl halide, and
         b. the balance up to 25 weight per cent of any given such first polymer being at least one copolymerized ethylenically unsaturated aliphatic monomer having a molecular weight under about 100,
   B. said shell portion being substantially a second polymer whose composition comprises:
      1. from about 2 to 30 weight percent of at least one polymerized long-chain aliphatic vinyl compound, and
      2. the balance up to 98 weight percent of any given such second polymer being a copolymerized vinyl halide,
   C. the weight ratio of said shell portion to said core portion ranging from about 0.20:1 to 1.50:1,
   D. said long-chain aliphatic vinyl compound being characterized by having at least one long-chain aliphatic vinyl compound characterized by the general formula:

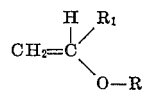

where $R_1$ is an aliphatic radical containing from eight through 22 carbons.

5. The polymer of claim 4 wherein said long-chain aliphatic vinyl monomer is cetyl vinyl ether.

6. The polymer of claim 4 wherein said first polymer comprises homopolyvinyl chloride.

* * * * *